United States Patent [19]
Weichmann et al.

[11] Patent Number: 5,895,802
[45] Date of Patent: Apr. 20, 1999

[54] REDISPERSIBLE POLYMER POWDERS, METHOD FOR THEIR PREPARATION AND APPLICATIONS

[75] Inventors: Josef Weichmann, Pleiskirchen; Alfred Kern, Kirchweidach, both of Germany

[73] Assignee: SKW Trostberg Aktiengesellchaft, Trostberg, Germany

[21] Appl. No.: 08/531,742

[22] Filed: Sep. 21, 1995

[30] Foreign Application Priority Data

Sep. 23, 1994 [DE] Germany ............................. 44 34 010

[51] Int. Cl.$^6$ ................................................ C08F 283/00
[52] U.S. Cl. ...................... 525/480; 525/347; 525/398; 525/472; 525/535; 525/540; 528/254; 528/255; 528/258; 528/265; 528/503
[58] Field of Search ........................... 528/481, 487, 528/503, 254, 255, 258, 265; 525/154, 158, 343, 491, 494, 497, 535, 540, 480, 347, 398, 472, 530

[56] References Cited

U.S. PATENT DOCUMENTS 5,071,945   12/1991   Weichmann et al. ................. 528/254
5,342,916    8/1994   Weiser et al. ........................ 528/150

*Primary Examiner*—Duc Truong
*Attorney, Agent, or Firm*—Nikaido, Marmelstein, Murray & Oram LLP

[57] ABSTRACT

The invention concerns redispersible polymer powders characterized by a proportion of 3 to 30% by wt relative to the polymer weight of condensation products of amino-s-triazine/formaldehyde/sulfite with molar ratios of amino-s-triazine to formaldehyde to sulfite of 1/1.3–6.0/0.3–1.5 and with a low free formaldehyde content. These condensation products of amino-s-triazine/formaldehyde/sulfite are exceedingly effective protective colloids when spray-drying polymer dispersions and can be combined in problem-free manner with casein.

17 Claims, No Drawings

REDISPERSIBLE POLYMER POWDERS, METHOD FOR THEIR PREPARATION AND APPLICATIONS

DESCRIPTION

The present invention concerns re-dispersible polymer powders, methods for their manufacture by atomizing aqueous dispersions into a hot flow of air, and applications of such redispersible polymer powders.

It is known how to manufacture free-flowing, redispersible polymer powders by spray-drying their aqueous dispersions. To prevent premature and undesired film formation on account of intermingling of the dispersion micelles during spray-drying, protective colloids must be added.

In particular water-soluble sulfite-modified amino-s-triazine-formaldehyde condensates have been found appropriate for such purposes; they are admixed to the polymer dispersion to be dried either before it is being dried in powder form, or preferably when in the form of an aqueous solution.

The German Offenlegungsschrift 20 49 114 discloses condensation products based on melamine, formaldehyde and sulfite, for instance in the form of Melment® L10 or F10, which is manufactured by SKW Trostberg AG. However it has been found that polymer dispersions containing these condensation products cannot be jointly spray-dried with casein suspensions or solutions, or that the dry material cannot be combined later with casein powders, because these melamine resins are fairly incompatible with casein.

Both casein and redispersible polymer dispersions are per se important raw materials in making hydraulically hardening construction materials. The addition of redispersible polymer powder is used foremost to improve the adhesion, bending strength and chemical resistance of the hardening construction material, whereas casein is used as a leveling agent prior to setting to assure higher mortar flowability. This feature is especially significant for self-leveling troweling materials and cement-based floors.

Heretofore it has been impossible to simultaneously use casein and dispersion powders illustratively spray-dried with Melment® because the dispersing effect of casein would have been prevented by the combination.

The known melamine-based condensation products evince another drawback in that on the average they typically have a content of 0.3% by wt (measured in a 40% by wt aqueous solution) of free formaldehyde. Inevitably this condition leads to contaminating the drier exhaust flow with formaldehyde because, during spray-drying, these quantities of formaldehyde are released at least in part from the aqueous phase and are evaporated. Consequently formaldehyde emissions take place into the ecology or costly purification of the exhausts is required.

Accordingly it is the object of the present invention to develop condensates of aminoplastic forming agents, formaldehyde and sulfite which are free from the stated drawbacks of the state of the art but instead may be used as protective colloids in the spray-drying of redispersible polymer powders without thereby impairing these powders when in combination with casein.

The invention solves this problem in that the redispersible polymer powders of the invention contain 3 to 30% by wt, related to the polymer weight, of a condensation product of an aminoplastic forming-agent component containing at least 50%-mole of one or more amino-s-triazines, a formaldehyde component and a sulfite component, with a molar ratio of aminoplastic forming agent to formaldehyde to sulfite of 1/1.3–6.0/0.3–1.5 and have a low content of free formaldehyde.

Indeed it was discovered in surprising manner that these condensation products of aminoplastic forming agent and formaldehyde represent, with a low content of free formaldehyde, exceedingly effective protective colloids when spray-drying polymer dispersions. Accordingly free formaldehyde is emitted neither in the drying exhaust air nor is it introduced in free or reversible chemically bonded form into the polymer dispersion to be dried or into the dispersion powder. In this manner polymer dispersions can be combined before and after spray-drying in problem-free manner with casein without thereby impairing the casein flow properties.

Again surprisingly, the condensation products of the invention may be used in quantities exceeding the quantum required by spray-drying. In this manner the condensation product can be introduced in simple manner, while finely distributed through the polymer powder, into a hydraulically hardening mixture of binders and will clearly raise the mixture's compressive strength by its plasticizing effect.

The protective colloids of the present invention represent condensation products of aminoplastic forming agents, formaldehyde and sulfite, which are defined on one hand by their molecular ratios and furthermore by their low content of free formaldehyde. The molar ratio of aminoplastic-forming-agent/formaldehyde/sulfite is 1/1.3–6.0/0.3–1.5 and preferably 1/2.0–3.0/0.8–1.3. Preferably amino-s-triazines are used as aminoplastic forming agents. A preferred amino-s-triazine is melamine, however guanamines such as benzo- or aceto-guanamine also may be used. It is possible furthermore within the scope of the present invention to use a mixture of amino-s-triazine with other aminoplastic forming agents, and up to 50%-mole of the mixture may consist of another aminoplastic forming agent such as urea, thiourea, dicyandiamide or guanidine (salts).

The sulfite components in the condensation products of the invention may be conventional sulfite derivatives, as a rule alkaline and alkaline-earth metal sulfites being preferred. However bisulfites or pyrosulfites may be used as well.

In a preferred implementation of the invention, the condensation product when preparing it in the form of an aqueous solution will contain solids from 25 to 55% by wt and is ready for use.

The viscosity of the liquid condensation products of the invention may be varied within wide limits, however it was found especially advantageous to use those condensation products which at preparation evince a viscosity between 4 and 1,000 mm$^2$/s at 80° C.

It is an essential feature of the invention that the free formaldehyde content of the condensation products be low, preferably <0.1% by wt and especially preferred <0.01% by wt, because only such constraints will allow problem-free combination of the spray-dried polymers with casein before or after drying. The statement of the weight of the free formaldehyde relates to a 40% by wt aqueous solution of the condensation products. The weight ratio of condensation products to casein may then be varied within wide limits, preferably being set however at 10/1 to 1/10.

The preparation of the condensation products of the invention based on aminoplastic forming agents, formaldehyde and sulfites is known from the European patent application 0,336,165 A1. Herewith this application shall be considered acknowledged. In said European patent application, the condensation products are recommended as plasticizers or dispersants for cementous suspensions of binders, however not in the form of redispersible polymer powders.

In addition to the condensation products, the redispersible polymer powders of the invention preferably contain vinyl- or acryl-based polymers. Examples of appropriate polymers are products of vinylacetate, vinylpropionate, vinyllaurate, vinylchloride, vinylidenechloride, straight-chain or branched vinylesters with 3 to 18 C atoms (esters of Versatic® acids), acryl- and methacryl-monomers, in particular esters, also styrene and ethene which may be present in the form of their homo-, co-, ter-polymers and as graft polymers.

These polymers may be conventionally prepared as dispersions by emulsion polymerization in the presence of radical initiators, emulsifiers and/or protective colloids, where called for regulators and other additives.

The redispersible polymer powders of the invention also may contain other additives besides the above described condensation products, for instance polyvinyl alcohol, polyvinyl pyrrolidone, cellulose derivatives or inert materials such as kaolin, silicic acid, chalk or earth alkali sulfates, which are used preferably in proportions of 1 to 40% by wt relative to the polymer weight.

The preparation of the polymer powders of the invention is comparatively uncritical. The corresponding polymer dispersions are mixed with the condensation product and where called for with further additives and then are subjected to conventional spray-drying.

The spraying of the aqueous polymer dispersions may be carried out using conventional technology at temperatures of 100 to 200° C., preferably at 120 to 170° C., at normal pressure, though also under vacuum.

The condensation-product addition of the invention effectively precludes sticking of the polymer powders during manufacture and storage, as a result of which redispersibility is maintained over a substantial time interval.

The redispersible polymer powders of the invention are especially appropriate as additives for such hydraulically setting materials as wall-tile adhesives, troweling materials, plasters, floorings or plaster floors and concrete mortar, wherein they are used in proportions of 2 to 30% by wt relative to the hydraulic binder. In particular they are suitable in simultaneous use with casein as flowing agents for troweling materials and as self-levelling floorings or plaster floors. In this respect the polymer dispersions of the invention offer the advantage of not interfering with the plasticizing effect of casein in the manner encountered in polymer dispersions dried by means of the heretofore conventional aminoplastic condensates.

The following Examples elucidate the invention.

EXAMPLE 1

(Preparing the Condensation Products)

A condensation product with the following molar ratios is prepared:

M=1; F=2.0 and $SO_3$=1.0, where M=melamine, F=formaldehyde and $SO_3$=sulfite.

Preparation: 400 g formalin (30% by wt) and 247 g water at a pH of 8.0 are introduced initially, then 252 g melamine are added and the pH is adjusted to 11.9 by means of 41 g NaOH (20% by wt). Thereupon 190 g sodium pyrosulfite are added with simultaneous heating to 70–80° C. After sulfite can no longer be detected, the pH is adjusted with 224 g sulfuric acid (10% by wt) to 5.5 and the reaction mixture is condensed further at 80° C. until the final viscosity of 6 $mm^2/s$ is reached at 80° C. Next, using 60 g NaOH (20% by wt), a five-minute after-treatment is applied at 80° C. in a strongly alkaline medium (pH=11.3) before cooling the product.

Properties: solid content=40.1% by wt; free formaldehyde content<0.01%.

EXAMPLE 2

(Preparing the Redispersible Polymer Powder)

A 50% by wt polymer dispersion of the following composition 45.2 parts by wt styrene 59.2 parts by wt butylacrylate, 0.8 parts by wt acrylamide and 0.8 parts by wt methacrylamide was mixed with equal amounts of the melamine-formaldehyde-sulfite based polycondensate.

Test a): Melment® L10 (SKW Trostberg AG)

Test b): condensate made in Example 1

Test c): without protective colloid

40% by wt solutions of the condensation products were used, the protective colloid each time being present at 5% by wt relative to the dispersion solid content. Next the mixtures were spray-dried in an atomizing drier. Whereas the polymer dispersion without melamine-formaldehyde-sulfite polycondensate, ie in test c), cannot be dried (film-formation or adhesion to drier walls), a powder yield of more than 85% by wt was achieved in both tests a) and b).

This is proof that the condensation products of Example 1 are just as appropriate for the spray-drying of polymers as the MFS resins known in the state of the art.

EXAMPLE 3

(Application)

The polymer dispersion powders prepared in Example 2a) or 2b) were processed each time in proportions of 8.5% by wt relative to the binder into polymer-enhanced mortars of the following compositions:

| | Mortar 3a) | | Mortar 3b |
|---|---|---|---|
| | Parts by weight | | |
| PZ 45 F | 200 | | 200 |
| Aluminous cement | 35 | | 35 |
| Silica sand 0.1–0.3 mm | 200 | | 200 |
| Quartz powder 40µ | 40 | | 40 |
| trisodium citrate | 2 | | 2 |
| Example 2a) redisperible polymer powder | 20 | Example 2b) | 20 |
| Casein | 3 | | 3 |
| Water | 112 | | 112 |

The flowabilities of both mortar samples were determined by filling a ring 4 cm high and 7 cm in diameter present on a plane glass plate which was entirely filled with mortar and thereupon lifting it.

The diameter in cm of the mortar cake flowing apart indicates the flowability:

Mortar 3a)=23.0 cm

Mortar 3b)=26.4 cm.

This Example proves that the polymer dispersions of the invention are combinable with casein.

We claim:

1. Redispersible polymer powder, comprising a redispersible polymer and 3 to 30% by wt relative to the weight of said redispersible polymer of a condensation product consisting of an aminoplastic forming agent, formaldehyde and sufite, with molar ratios of aminoplastic forming agent to formaldehyde to sulfite of 1/1.3–6.0/0.3–1.5, wherein said condensation product, when measured in a 40% by weight aqueous solution, evinces a free formaldehyde content of <0.1% by weight.

2. Polymer powder defined in claim 1, characterized in that the aminoplastic forming agent component substantially consists of melamine.

3. Polymer powder defined in claim 1, characterized in that the molar ratios of aminoplastic forming agent to formaldehyde to sulfite are 1/2.0–3.0/0.8–1.3.

4. Polymer powder defined in claim 1, characterized in that the free formaldehyde content is <0.01% by wt.

5. Polymer powder defined in claim 1, characterized in that the condensation product is used in the form of an aqueous solution with a solid content of 25 to 55% by wt.

6. Polymer powder defined in claim 1, characterized in that when prepared the condensation product evinces a viscosity of 4 to 1,000 mm$^2$/s at 80° C.

7. Polymer powder defined in claim 1, characterized in that said polymer powder furthermore contains casein.

8. Polymer powder defined in claim 7, characterized in that the weight ratio of condensation product to casein is 10/1 to 1/10.

9. Polymer powder defined in claim 1, characterized in that said polymer powder contains at least one further additive selected from the group consisting of polyvinyl alcohol, polyvinyl pyrrolidone, and cellulose derivatives or at least one inert material selected from the group consisting of kaolin, silicic acid, chalk and earth-alkali sulfates, in proportions of 1 to 40% by wt relative to the polymer weight.

10. A method for preparing a polymer powder comprising adding a condensation product to a polymer dispersion, said condensation product comprising an aminoplastic forming agent, formaldehyde and sulfite, with molar ratios of aminoplastic forming agent to formaldehyde to sulfite of 1/1.3–6.0/0.3–1.5, wherein said condensation product, when measured in a 40% by weight aqueous solution, evinces a free formaldehyde content of <0.1% by weight, thereby forming a mixture and spray-drying said mixture.

11. Method defined in claim 10, characterized in that the condensation product is used in the form of an aqueous solution with a solid content of 25 to 55% by wt.

12. Method defined in claim 10, characterized in that the condensation product evinces a viscosity of 4 to 1,000 mm$^2$/s at 80° C.

13. Method defined in claim 10, characterized in that spray-drying is carried out at a temperature between 100 and 200° C.

14. Method defined in claim 10, characterized in that spray-drying is carried out at a temperature between 120 and 170° C.

15. Redispersible polymer as recited in claim 1, wherein said aminoplastic forming agent comprises at least 50 mol % of at least one amino-s-triazine.

16. A method as recited in claim 10, further comprising adding at least one additive to said polymer dispersion.

17. Redispersible polymer powder, comprising a redispersible polymer, casein, and 3 to 30% by wt relative to the weight of said redispersible polymer of a condensation product consisting of an aminoplastic forming agent, formaldehyde and sufite, with molar ratios of aminoplastic forming agent to formaldehyde to sulfite of 1/1.3–6.0/0.3–1.5, wherein said condensation product, when measured in a 40% by weight aqueous solution, evinces a free formaldehyde content of <0.1% by weight.

* * * * *